United States Patent
Deng et al.

(10) Patent No.: US 7,327,776 B2
(45) Date of Patent: Feb. 5, 2008

(54) TIME DOMAIN SPREADING METHOD AND APPARATUS FOR A UWB RECEIVER COMPRISING FAST FOURIER TRANSFORM AND EXCHANGE OF REAL AND IMAGINARY COMPLEX SIGNAL COMPONENTS

(75) Inventors: Juinn-Horng Deng, Pingjhen (TW); Kuang-Shyr Wu, Taoyuan Hsien (TW); Yu-Min Chuang, Hsinchu (TW)

(73) Assignee: Chung Shan Institute of Science and Technology, Armaments Bureau, M.N.D., Taoyuan (TW)

( * ) Notice: Subject to any disclaimer, the term of this patent is extended or adjusted under 35 U.S.C. 154(b) by 585 days.

(21) Appl. No.: 11/018,481

(22) Filed: Dec. 20, 2004

(65) Prior Publication Data

US 2006/0133452 A1 Jun. 22, 2006

(51) Int. Cl.
*H04B 1/00* (2006.01)
*H04K 1/10* (2006.01)

(52) U.S. Cl. .............. 375/130; 375/260; 375/322

(58) Field of Classification Search ............ 375/130, 375/152, 260, 322
See application file for complete search history.

(56) References Cited

U.S. PATENT DOCUMENTS

| | | | |
|---|---|---|---|
| 5,666,352 A * | 9/1997 | Ohgoshi et al. ......... 370/206 |
| 6,005,887 A * | 12/1999 | Bottomley et al. ......... 375/147 |
| 6,130,918 A | 10/2000 | Humphrey et al. ......... 375/295 |
| 6,294,956 B1 * | 9/2001 | Ghanadan et al. ...... 330/124 R |
| 2005/0170805 A1 * | 8/2005 | Hammes et al. ............ 455/255 |
| 2005/0259758 A1 * | 11/2005 | Razzell ...................... 375/260 |

FOREIGN PATENT DOCUMENTS

| | | |
|---|---|---|
| EP | 1079577 | 12/2003 |
| EP | 1176516 | 3/2004 |

\* cited by examiner

*Primary Examiner*—Nick Corsaro
*Assistant Examiner*—Gina McKie
(74) *Attorney, Agent, or Firm*—J.C. Patents

(57) ABSTRACT

A time domain spreading method and apparatus for a UWB receiver are provided. Wherein, a series of received symbol signals are received by the UWB receiver, and transformed by the fast Fourier transform to obtain a series of transformed signals Y(m) according to one of the received symbol signals. $Y(m)=Y_I(m)+jY_Q(m)$, and m is a positive integer more than zero. The real part and imaginary part of the transferred signals are exchanged and the exchanged signals are inversely outputted to obtain a plurality of despreading received data signals X(m), and $X(m)=Y_Q(-m)+jY_I(-m)$.

7 Claims, 4 Drawing Sheets

TIME DOMAIN SPREADING METHOD AND APPARATUS FOR A UWB RECEIVER COMPRISING FAST FOURIER TRANSFORM AND EXCHANGE OF REAL AND IMAGINARY COMPLEX SIGNAL COMPONENTS

BACKGROUND OF THE INVENTION

1. Field of the Invention

The present invention relates to an ultra-wide band (UWB) receiver, and more particularly to a time domain spreading method and apparatus for a UWB receiver.

2. Description of the Related Art

Ultra-wide band (UWB) technology is a present wireless telecommunication technology for short distance wireless data transmission and receiving. The UWB technology has the advantages of low-power consumption, high transmission rate, and low cost so that it can be applied to the high-quality, high-capacity wireless telecommunication. For the high-speed communication among digital apparatuses in houses or offices, the UWB technology provides the accessibility and convenience for wireless telecommunication. In addition, the UWB technology can provide short-distance communication services, such as the transmission of high-quality images, music, and high-capacity data, for wireless personal area networks (WPANs). It also can be applied to the wireless local area networks (WLANs), home networks, and short-distance radars.

In the UWB wireless communication technology, the prior technology used to maintain orthogonality after the fast Fourier transform (FFT) and improve multi-path fading includes following two methods. One is to add cyclic prefix in the frequency signals of the FFT. This approach, however, is vulnerable to create a saw-type harmonic loss. In order to remove the saw-type harmonic loss of the frequency signal generated from the transmitter, adding the cyclic prefix is replaced by adding zero-padded prefix to eliminate the multi-path fading and signal harmonic loss.

In the multi-band orthogonal-frequency-division-multiplexing (MB OFDM) system, the frequency is divided into 14 bands. Each band has a bandwidth about 528 MHz. The bands are sequentially allocated between 3.1 GHz and 10.6 GHz, in order to transmit a series of OFDM symbol signals to the corresponding bands. Wherein, in the specification of the UWB transmitter, the signal period of a OFDM symbol signal is about 312.5 ns for 165 sampling times, which comprises the zero-padded prefix 60.6 ns for 32 sampling times, the data signal 242.4 ns for 128 sampling times, and the guard interval for switching diffefent bands about 9.5 ns for 5 sampling times.

FIG. 1 is a schematic configuration showing a prior art time domain spreading method for a symbol signal of a UWB transmitter. The inverse FFT is performed to a symbol signal S(n). The symbol signal is inputted to a time domain spreading apparatus 100. The time domain spreading apparatus 100 not only transmits the series of symbol signals S(n) with a band, but also exchanges the real part and the imaginary part of the symbol signals S(n) to obtain another symbol signals R(n). The symbol signals R(n) are transmitted in another band to practically perform the time domain spreading operation. Wherein, $S(n)=P_1(n)+jP_Q(n)$, and the real-image-exchanged symbol signals $R(n)=P_Q(n)+jP_1(n)$, and n is an integer between 1 to 128.

In the UWB receiver, a special technique is required for the time domain despreading operation. The prior art despreading circuit is different from the spreading circuit of the transmitter. The different spreading circuit of the transmitter will increase costs. In addition, complexity of the channel compensation mechanism of the prior art receiver is increased. Errors are easy to occur, and the receiver cannot normally function.

SUMMARY OF THE INVENTION

Accordingly, the present invention is directed to a time domain spreading method for an ultra-wide band (UWB) receiver to reduce the complexity of the channel compensation mechanism and errors and to improve the signal quality.

The present invention is also directed to a time domain spreading apparatus for a UWB receiver to reduce the complexity of the channel compensation mechanism and errors and to improve the signal quality.

The present invention provides a time domain spreading method for a UWB receiver. The UWB receiver is adapted to receive a series of multi-band orthogonal-frequency-division-multiplexing (MB OFDM) symbol signals transmitted from a UWB transmitter. The UWB transmitter comprises a time domain spreading apparatus to exchange real part and imaginary part of a signal $S(n)=P_1(n)+jP_Q(n)$ to obtain another signal $R(n)=P_Q(n)+jP_1(n)$, and n is an integer. The UWB receiver receives a series of received symbol signals. The time domain spreading method for the UWB receiver comprises following steps: performing a fast Fourier transform (FFT) to obtain a series of transformed signals Y(m) according to one of the received symbol signals, wherein the $Y(m)=Y_1(m)+jY_Q(m)$, and m is an integer; and exchanging real part and imaginary part of the transformed signals, inversely outputting the exchanged signals to obtain a plurality of despreading received data signals X(m), wherein the $X(m)=Y_Q(-m)+jY_1(-m)$.

The present invention provides a time domain spreading apparatus of an ultra-wide band (UWB) receiver. The UWB receiver is adapted to receive a series of multi-band orthogonal-frequency-division-multiplexing (MB OFDM) symbol signals transmitted from a UWB transmitter. The UWB transmitter comprises a time domain spreading apparatus to exchange real part and imaginary part of a signal $S(n)=P_1(n)+jP_Q(n)$ to obtain another signal $R(n)=P_Q(n)+jP_1(n)$, and n is an integer larger than 0. The UWB receiver receives a series of received symbol signals. The UBW receiver further comprises a fast Fourier transformer coupled to the time domain spreading apparatus. The fast Fourier transformer performs a fast Fourier transform to obtain a series of transformed signals Y(m) according to one of the received symbol signals, wherein the $Y(m)=Y_1(m)+jY_Q(m)$, and the m is an integer larger than 0. Wherein, the time domain spreading method for the UWB receiver is characterized in exchanging real part and imaginary part of the transformed signals, and inversely outputs the exchanged signals to obtain a plurality of despreading received data signals X(m), wherein the $X(m)=Y_Q(-m)+jY_1(-m)$.

According to a preferred embodiment of the present invention, the n is an integer from 1 to 128, and the m is an integer from 1 to 128, for example.

The present invention uses the simple time domain spreading method and apparatus. The complexity of the UWB receiver can be reduced and the signal errors can also be reduced.

The above and other features of the present invention will be better understood from the following detailed description of the preferred embodiments of the invention that is provided in communication with the accompanying drawings.

DESCRIPTION OF SOME EMBODIMENTS

Figure 1:
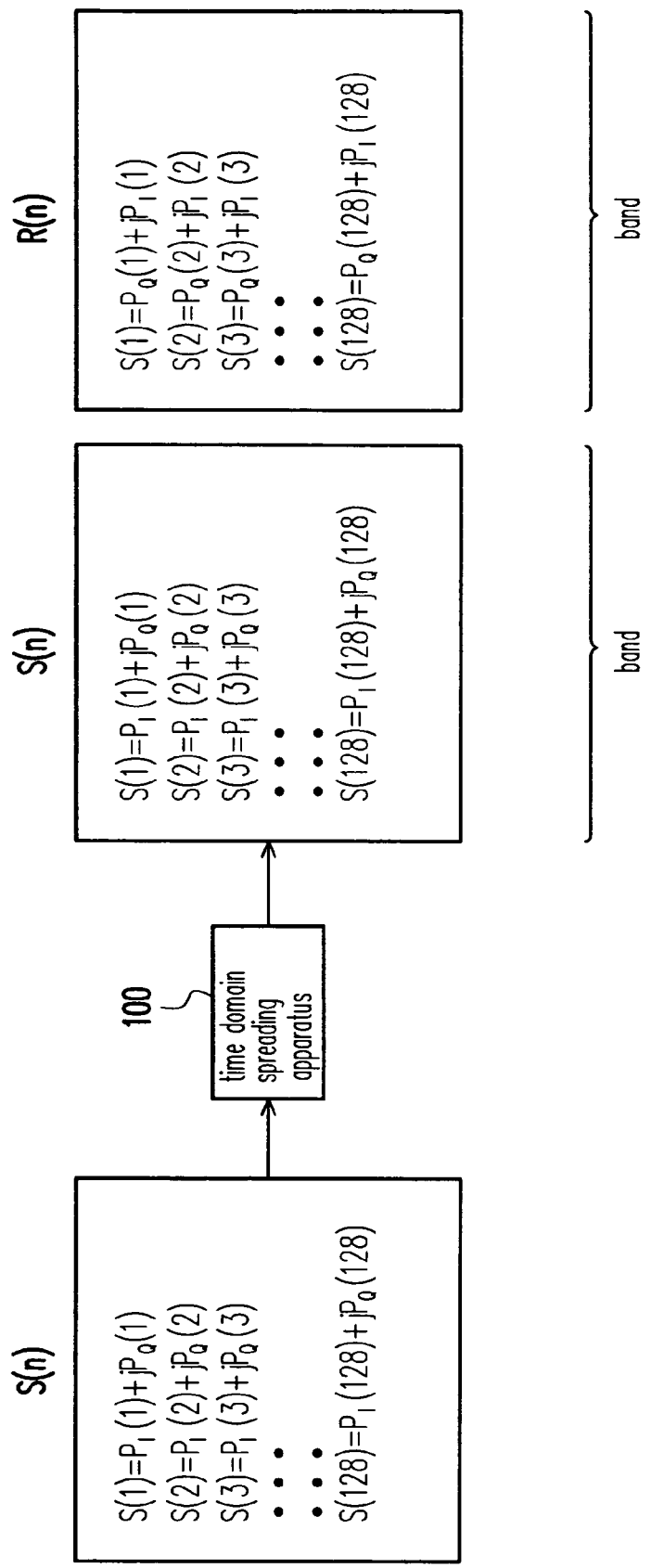
FIG. 1 is a schematic configuration showing a prior art time domain spreading method for a symbol signal of a UWB transmitter.
Figure 2:
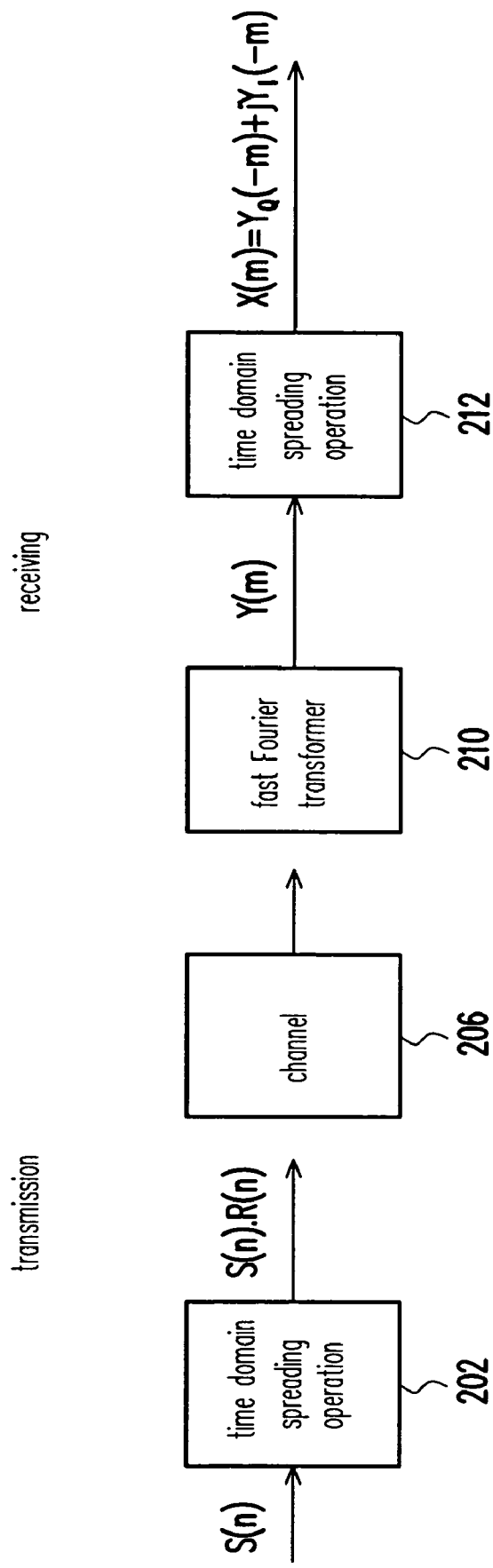
FIG. 2 is a schematic block diagram showing a time domain spreading method for an ultra-wide band (UWB) receiver according to an embodiment of the present invention.
Figure 3:
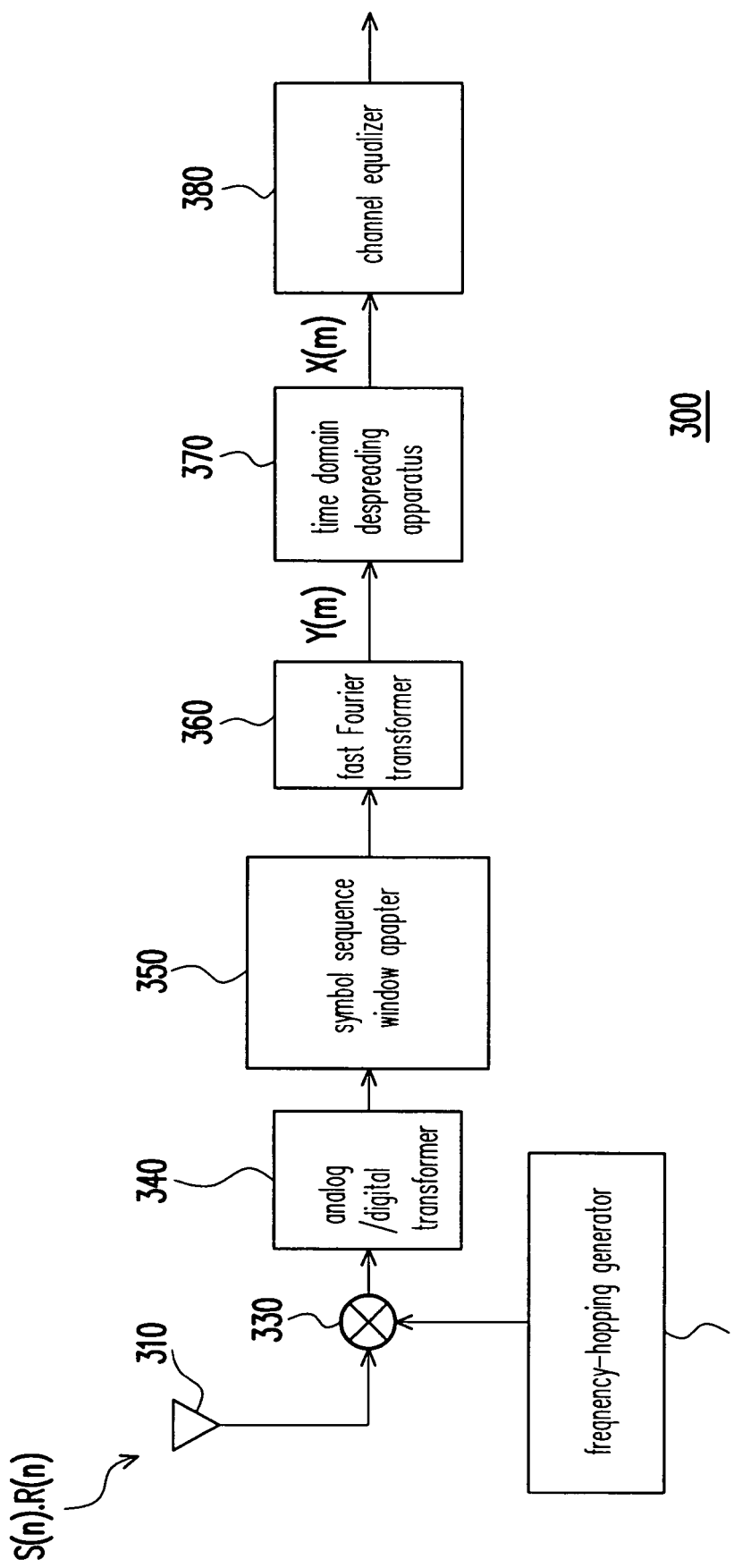
FIG. 3 is a schematic block diagram showing a UWB receiver according to an embodiment of the present invention.

FIG. 2 is a schematic block diagram showing a time domain spreading method for an ultra-wide band (UWB) receiver according to an embodiment of the present invention. FIG. 3 is a schematic block diagram showing a UWB receiver according to an embodiment of the present invention.

Referring to FIG. 2, in the UWB data transmission/receiving system of the multi-band orthogonal-frequency-division-multiplexing (MB OFDM), a symbol signal S(n) is high-frequency transmitted by the carrier waves of the wireless telecommunication technology and real part and imaginary part of the symbol signal S(n) are exchanged to perform the time domain spreading operation. By the time domain spreading operation 202, another series of signals R(n) is obtained. The signal R(n) is then transmitted to a UWB receiver 300 through a multi-path channel 206 as shown in FIG. 3. Wherein, the $S(n)=P_1(n)+jP_Q(n)$, the real-image-exchanged signal $R(n)=P_Q(n)+jP_1(n)$, and n is an integer from 1 to 128. Accordingly, the data signal of the MB OFDM symbol signal is maintained about 242.4 ns for 128 sampling times. The zero-padded prefix at the front end of the data signal is about 60.6 ns for 32 sampling times. The guard interval (GI) of switching for different frequencies at the back end of the data signal is about 9.5 ns for 5 sampling times.

According to defined time and the start position of the symbol timing window, the UWB receiver 300 receives the series of OFDM symbol signals S(n) and R(n). The band switching occurs at each initial position of the symbol timing window to obtain a series of received symbol signals. According to one of the received symbol signals, a fast Fourier transform (FFT) 210 is performed to obtain a series transformed signals Y(m), wherein $Y(m)=Y_1(m)+jY_Q(m)$, $Y_1(m)$ is the real part of the Y(m), $Y_Q(m)$ is the imaginary part of the Y(m), and m is an integer from 1 to 128. The time domain spreading operation 212 is performed to exchange the real part and imaginary part of the transformed signal Y(m), and to inversely output the exchanged signal to obtain a plurality of despreading received data signal X(m), wherein $X(m)=Y_Q(-m)+jY_1(-m)$.

Referring to FIG. 3, the UWB receiver 300 comprises an antenna 310, a frequency-hopping generator 320, a frequency mixer 330, an analog/digital transformer 340, a symbol sequence window adapter 350, a fast Fourier transformer 360, a time domain despreading apparatus 370, and a channel equalizer 380. Wherein, the antenna 310 of the UWB receiver 300 receives a series of MB OFDM symbol signals S(n) and R(n) from the UWB transmitter (not shown). The MB OFDM signals are inputted to the frequency mixer 330 to frequency mix the central frequency signal generated from the frequency-hopping generator 320 for removing the carrier waves and obtain the real part MB OFDM signals. The output from the frequency mixer 330 is transmitted to the analog/digital transformer 340 to be transformed into digital signals. The symbol sequence window adapter 350 receives the output from the analog/digital transformer 340 to remove the zero-padded prefix sequence and the guard interval sequence. The channel effect tail is added to the front end of the received data signal to output the added received data signal. The received signal thus has the circular convolution characteristic.

The received data signal is inputted to the fast Fourier transformer 360 to perform frequency domain transform and to obtain a series of the transformed signal Y(m). Wherein, $$Y(m) = \sum_{n}^{N-1} R(n)e^{-j2\pi \frac{m}{N}n} \quad (1)$$

$$= \sum_{n}^{N-1} \{P_Q(n) + jP_I(n)\}e^{-j2\pi \frac{m}{N}n}$$

$$= jX^*(-m)$$

$$Y(m) = Y_I(m) + jY_Q(m) \quad (2)$$

According to the formulas (1) and (2), the despreading received data signal X(m) can be obtained by inputting the transformed signal to the time domain despreading apparatus 370, exchanging the real part and the imaginary part of the transformed signal, inversely outputting the exchanged signal $X(m)=Y_Q(-m)+jY_1(-m)$.

Finally, the received data signal is transmitted to the channel equalizer 380. The channel equalizer 380 usually compensates the harmonic loss resulting from the intersymbol interference (ISI). Without increasing the power of the data transmission and the bandwidth of the channel, the channel equalizer 380 compensate the amplitude and delay of the received signal to enhance the quality of the transmission channel.

Figure 4:
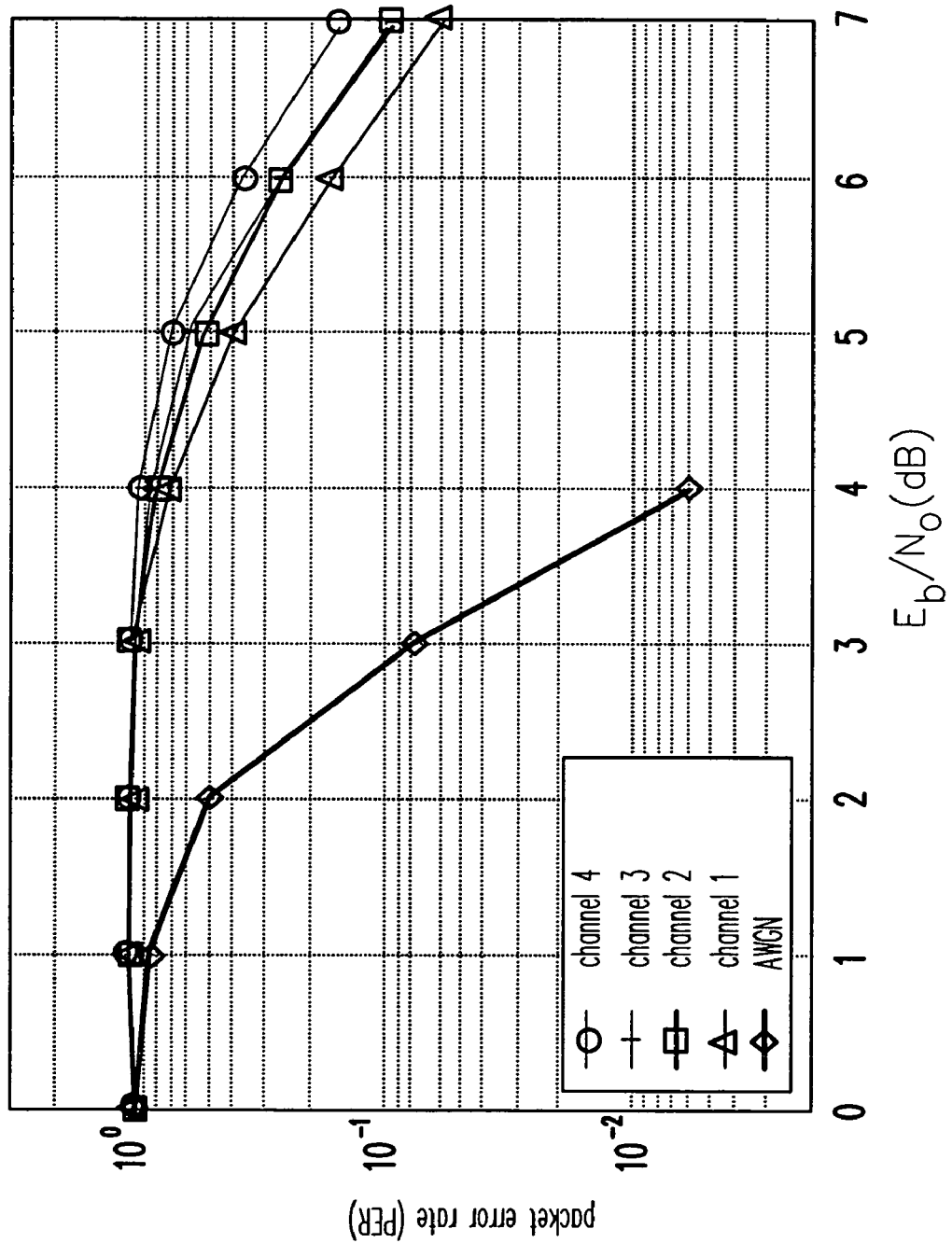
FIG. 4 is a curve showing a relationship between the packet error rate (PER) and the signal/noise ($E_b/N_o$) ratio.

FIG. 4 is a curve showing a relationship between the packet error rate (PER) and the signal/noise ($E_b/N_o$) ratio. By simulation, in the UWB system with the 200 Mbps-transmission-rate MB OFDM, the PER can meet the requirement of the specification of the UWB in the environments of the added white gauss noise (AWGN) and the UWB channels CM 1-4.

Accordingly, the present invention uses the simple time domain spreading method and apparatus. The FFT of the UWB is transmitted to the time domain despreading apparatus to exchange the real part and the imaginary part of the data and to change the output sequence of the data. Accordingly, the complexity of the compensation mechanism of the UWB receiver can be reduced, and the signal errors are also reduced.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A time domain spreading method for a ultra-wide band (UWB) receiver, the UWB receiver being adapted to receive a series of multi-band orthogonal-frequency-division-multiplexing (MB OFDM) symbol signals transmitted from a UWB transmitter, the UWB transmitter comprising a time domain spreading apparatus to exchange real part and imaginary part of a signal $S(n)=P_1(n)+jP_Q(n)$ to obtain another signal $R(n)=P_Q(n)+jP_1(n)$, wherein n is an integer, and the UWB receiver receives a series of symbol signals, the time domain spreading method for the UWB receiver comprising following steps:

performing a fast Fourier transform (FFT) to obtain a series of transformed signals Y(m) according to one of the received signals, wherein the $Y(m)=Y_1(m)+jY_Q(m)$, and m is an integer; and exchanging real part and imaginary part of the transformed signals, inversely outputting the exchanged signals to obtain a plurality of despreading received data signals X(m), wherein the $X(m)=Y_Q(-m)+jY_1(-m)$.

2. The time domain spreading method for the UWB receiver of claim 1, wherein the n is an integer from 1 to 128.

3. The time domain spreading method for the UWB receiver of claim 1, wherein the m is an integer from 1 to 128.

4. A time domain spreading apparatus of a ultra-wide band (UWB) receiver, the UWB receiver being adapted to receive a series of multi-band orthogonal-frequency-division-multiplexing (MB OFDM) symbol signals transmitted from a UWB transmitter, the UWB transmitter comprising a time domain spreading apparatus to exchange real part and imaginary part of a signal $S(n)=P_1(n)+jP_Q(n)$ to obtain another signal $R(n)=P_Q(n)+jP_1(n)$, n being an integer larger than 0, the UWB receiver receiving a series of symbol signals, the UBW receiver further comprising a fast Fourier transformer coupled to the time domain spreading apparatus, the fast Fourier transformer performing a fast Fourier transform to obtain a series of transformed signals Y(m) according to one of the received signals, the $Y(m)=Y_1(m)+jY_Q(m)$, the m being an integer larger than 0, wherein the time domain spreading method for the UWB receiver is characterized in exchanging real part and imaginary part of the transformed signals, inversely outputting the exchanged signals to obtain a plurality of despreading received data signals X(m), wherein the $X(m)=Y_Q(-m)+jY_1(-m)$.

5. The time domain spreading apparatus of the UWB receiver of claim 4, wherein the n is an integer from 1 to 128.

6. The time domain spreading apparatus of the UWB receiver of claim 4, wherein the m is an integer from 1 to 128.

7. The time domain spreading apparatus of the UWB receiver of claim 4, wherein the UWB receiver further comprises a channel equalizer coupled to an output terminal of the time domain spreading apparatus.

* * * * *